United States Patent
Kim et al.

(10) Patent No.: US 9,912,924 B2
(45) Date of Patent: Mar. 6, 2018

(54) IMAGE FORMING APPARATUS, IMAGE FORMING METHOD, IMAGE PROCESSING APPARATUS AND IMAGE PROCESSING METHOD THEREOF

(71) Applicant: SAMSUNG ELECTRONICS CO., LTD., Suwon-si (KR)

(72) Inventors: Chang-won Kim, Gwangju-si (KR); Seung-hoon Han, Suwon-si (KR); Young-seok Han, Yongin-si (KR); Dong-hyun Kim, Seongnam-si (KR); Jin-woo Jeong, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 14/876,253

(22) Filed: Oct. 6, 2015

(65) Prior Publication Data

US 2016/0100147 A1   Apr. 7, 2016

(30) Foreign Application Priority Data

Oct. 6, 2014   (KR) ........................ 10-2014-0134561

(51) Int. Cl.
*H04N 5/20*   (2006.01)
*H04N 9/64*   (2006.01)
(Continued)

(52) U.S. Cl.
CPC .............. *H04N 9/646* (2013.01); *H04N 5/20* (2013.01); *H04N 9/7908* (2013.01); *H04N 9/80* (2013.01);
(Continued)

(58) Field of Classification Search
None
See application file for complete search history.

(56) References Cited

U.S. PATENT DOCUMENTS 6,771,323 B1   8/2004   Dean et al.
7,826,709 B2   11/2010   Moriya et al.
(Continued)

FOREIGN PATENT DOCUMENTS

CN   102740095 A   10/2012
CN   103004213 A   3/2013
(Continued)

OTHER PUBLICATIONS

Communication dated Mar. 7, 2016, issued by the European Patent Office in counterpart European Application No. 15185133.4.
(Continued)

*Primary Examiner* — Eileen Adams
(74) *Attorney, Agent, or Firm* — Sughrue Mion, PLLC

(57) ABSTRACT

An image processing method, including: receiving image content and metadata of the image content, the metadata content comprising flag information indicating whether to perform image processing on the image content and image processing information; determining whether to perform the image processing for each frame based on the flag information; performing, in response to determining to perform the image processing for an image frame, the image processing based on the image processing information on the image frame; and outputting the image processed image frame on which the image processing is performed.

15 Claims, 18 Drawing Sheets

(51) Int. Cl.
*H04N 9/80* (2006.01)
*H04N 9/79* (2006.01)
*H04N 9/87* (2006.01)
*H04N 11/24* (2006.01)
*H04N 21/6547* (2011.01)
*H04N 9/68* (2006.01)

(52) U.S. Cl.
CPC ............. *H04N 9/87* (2013.01); *H04N 11/002* (2013.01); *H04N 21/6547* (2013.01); *H04N 9/643* (2013.01); *H04N 9/68* (2013.01)

(56) References Cited

U.S. PATENT DOCUMENTS

| | | | |
|---|---|---|---|
| 8,811,800 B2 | 8/2014 | Moriya et al. | |
| 8,928,686 B2 | 1/2015 | Messmer | |
| 8,976,229 B2 | 3/2015 | Witt et al. | |
| 9,728,117 B2 | 8/2017 | Messmer | |
| 2002/0116471 A1 | 8/2002 | Shteyn | |
| 2005/0089247 A1 | 4/2005 | Braun et al. | |
| 2005/0149557 A1 | 7/2005 | Moriya et al. | |
| 2006/0056712 A1* | 3/2006 | Endo ............... H04N 21/234336 382/232 | |
| 2006/0239549 A1 | 10/2006 | Kelly et al. | |
| 2007/0074266 A1 | 3/2007 | Raveendran et al. | |
| 2008/0065697 A1 | 3/2008 | Moriya et al. | |
| 2008/0071836 A1 | 3/2008 | Moriya et al. | |
| 2008/0071837 A1 | 3/2008 | Moriya et al. | |
| 2008/0071838 A1 | 3/2008 | Moriya et al. | |
| 2008/0075431 A1 | 3/2008 | Moriya et al. | |
| 2008/0088858 A1 | 4/2008 | Marcu et al. | |
| 2008/0107360 A1 | 5/2008 | Yamashita et al. | |
| 2009/0135264 A1 | 5/2009 | John | |
| 2010/0005070 A1 | 1/2010 | Moriya et al. | |
| 2011/0206348 A1 | 8/2011 | Numakami | |
| 2012/0257013 A1 | 10/2012 | Witt et al. | |
| 2013/0076763 A1* | 3/2013 | Messmer ............... H04N 1/6058 345/506 | |
| 2013/0155330 A1* | 6/2013 | Longhurst ............... H04N 9/64 348/708 |
| 2013/0162666 A1 | 6/2013 | Messmer et al. | |
| 2013/0222535 A1* | 8/2013 | Klein Gunnewiek .. G06T 5/002 348/43 | |
| 2013/0300772 A1 | 11/2013 | Kim | |
| 2014/0232614 A1 | 8/2014 | Kunkel | |
| 2015/0103091 A1 | 4/2015 | Messmer | |
| 2015/0356105 A1* | 12/2015 | Knutson ........... G06F 17/30091 707/624 | |

FOREIGN PATENT DOCUMENTS

| | | |
|---|---|---|
| EP | 2509326 A2 | 10/2012 |
| EP | 2 672 712 A1 | 12/2013 |
| EP | 2 800 352 A1 | 11/2014 |
| JP | 2013-138351 A | 7/2013 |
| KR | 10-2002-0093933 A | 12/2002 |
| KR | 10-2009-0107907 A | 10/2009 |
| KR | 10-2010-0036601 A | 4/2010 |
| KR | 10-0997599 B1 | 11/2010 |
| KR | 10-2013-0125970 A | 11/2013 |
| WO | 2011/156074 A2 | 12/2011 |
| WO | 2012/054143 A1 | 4/2012 |
| WO | 2012/166382 A2 | 12/2012 |

OTHER PUBLICATIONS

Communication from the European Patent Office issued Nov. 20, 2015 in a counterpart European Application No. 15185133.4.
International Search Report for PCT/KR2015/009397 dated Dec. 17, 2015 [PCT/ISA/210].
Written Opinion for PCT/KR2015/009397 dated Dec. 17, 2015 [PCT/ISA/237].
Communication dated Dec. 4, 2017, from the State Intellectual Property Office of People's Republic of China in counterpart Application No. 201510599696.9.

* cited by examiner

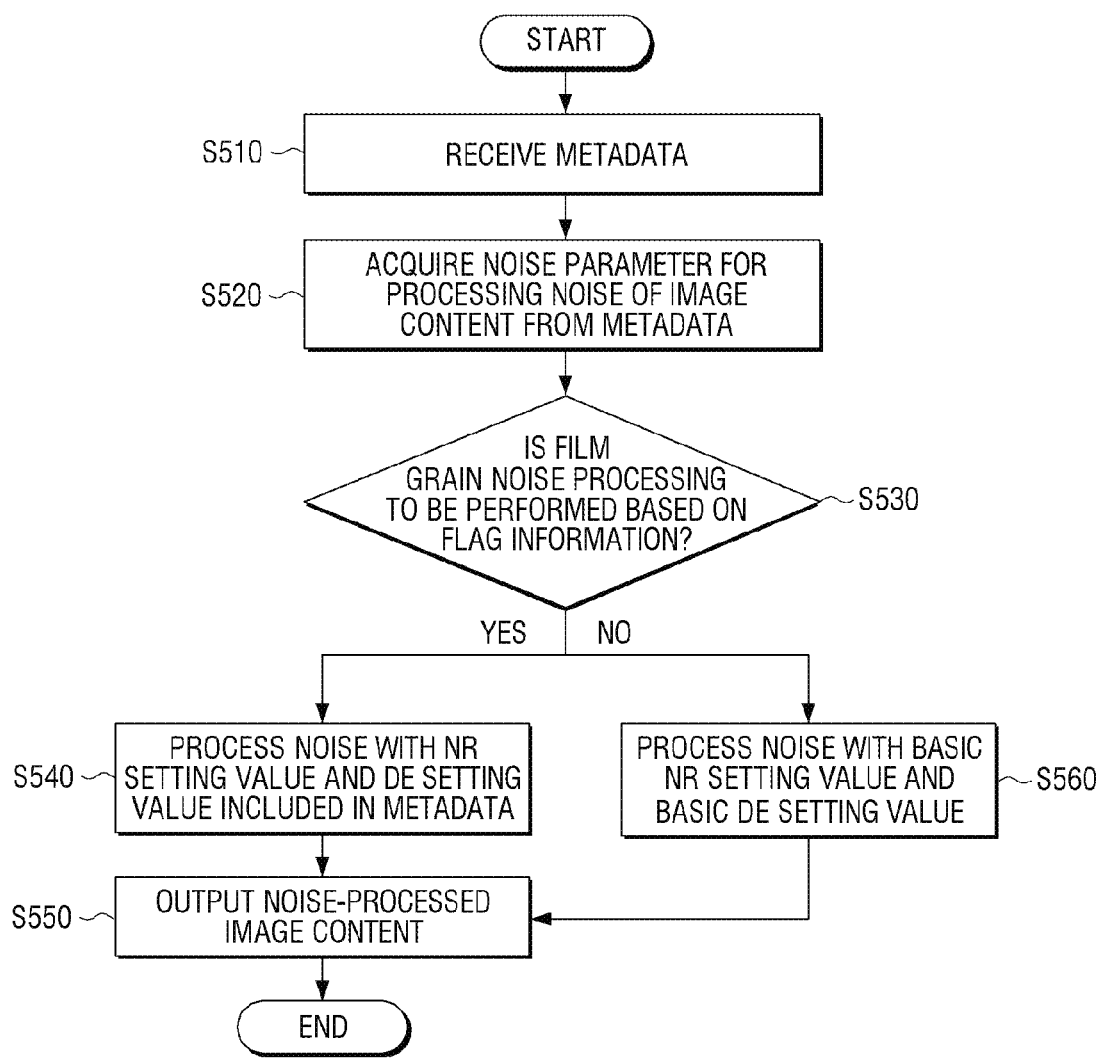

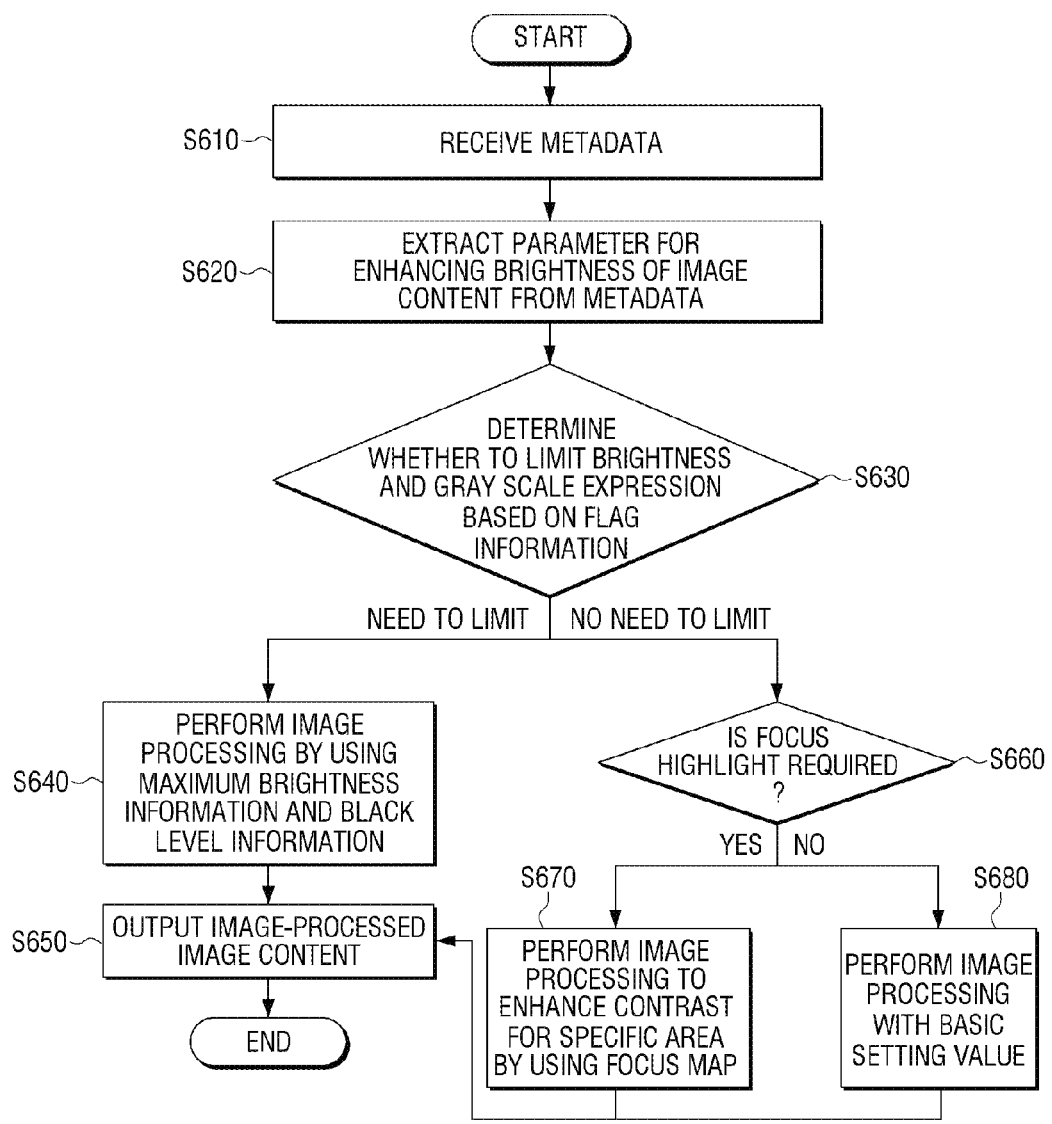

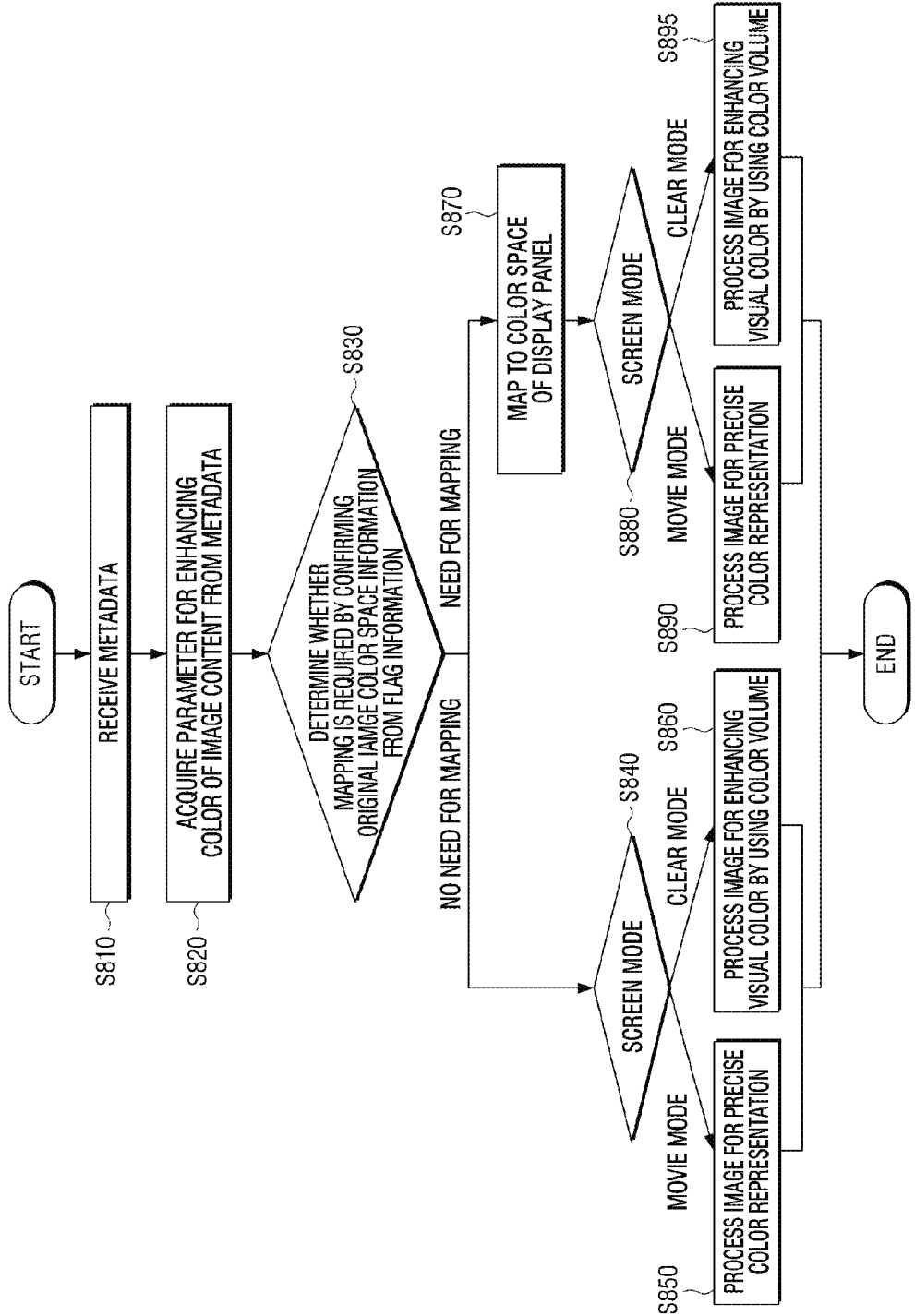

FIG. 8D

| Metadata | | Range(10bit) | |
|---|---|---|---|
| | | Min | max |
| Face1 Ex)Caucasian | H | 0~1023 | 0~1023 |
| | S | 0~1023 | 0~1023 |
| | V | 0~1023 | 0~1023 |
| Face2 Ex)African | H | 0~1023 | 0~1023 |
| | S | 0~1023 | 0~1023 |
| | V | 0~1023 | 0~1023 |
| Face3 Ex)Asian | H | 0~1023 | 0~1023 |
| | S | 0~1023 | 0~1023 |
| | V | 0~1023 | 0~1023 |

IMAGE FORMING APPARATUS, IMAGE FORMING METHOD, IMAGE PROCESSING APPARATUS AND IMAGE PROCESSING METHOD THEREOF

CROSS-REFERENCE TO RELATED APPLICATIONS

This application claims priority from Korean Patent Application No. 10-2014-0134561, filed on Oct. 6, 2014, in the Korean Intellectual Property Office, the disclosure of which is incorporated herein by reference in its entirety.

BACKGROUND

Field

Apparatuses and methods consistent with one or more exemplary embodiments relate to an image processing apparatus and an image processing method thereof, and more particularly, to an image processing apparatus and an image processing method thereof for processing an image by using metadata included in image content.

Description of the Related Art

Various image processing methods for improving a quality of image content have been provided. For example, an image processing method for improving various image quality elements such as sharpness, brightness of image content, and color has been provided.

High-definition image content have also been provided recently. To perform image processing on high-definition image content, image processing information is required. However, metadata in the related art includes only information on a resolution and a size of the existing image content, but does not include information for image processing.

In particular, blur, noise, and the like may cause degradation of the quality of the high-definition image content (for example, 4K image content). Of blur which appears in movie content, there is a blur due to camera motion and a blur due to film scanner jitter. Blur due to the camera motion may be an intended effect of a director, and an image processing apparatus may have difficulty automatically determining and processing the content according to the director's intention. As to blur due to the film scanner jitter, the image processing apparatus needs to perform image processing to remove the blur due to a problem of a scanner. That is, it may be desirable to remove the blur depending on a producer's intention even in the same image.

Further, noise may include film grain noise, Gaussian noise, breathing noise in which noise among I/B/P frames excessively occurs, etc. Film grain noise may be inserted according to a producer's intention, and it may be desirable that the image processing apparatus not unconditionally remove the film grain noise. On the other hand, the Gaussian noise may not be intentional, but appears during a producing process, and should be removed by the image processing apparatus. The breathing noise occurs in a flicker form by a periodic repetition of gradually blurring noise, which stands out in the I frame, in the B/P frames, and blurring the noise which again stands out in the I Frame, and typically occurs in an image which is excessively compressed. The breathing noise needs to be removed to provide a clear screen, but it is difficult to determine whether there is noise and to know I/B/P frame information in an image quality enhancement algorithm, and as a result, it is difficult to process the breathing noise.

That is, as described above, the existing system of using metadata in which information associated with the image processing is not included may not perform the optimum image quality processing to fit a producer's intention.

SUMMARY

One or more exemplary embodiments overcome the above disadvantages and other disadvantages not described above. Also, one or more exemplary embodiments are not required to overcome the disadvantages described above, and an exemplary embodiment may not overcome any of the problems described above.

One or more exemplary embodiments provide an image processing apparatus and an image processing method capable of performing optimum image processing to fit a producer's intention of image content by using metadata which includes flag information indicating whether to perform the image processing and image processing information.

According to an aspect of one or more exemplary embodiments, there is provided an image processing method including: receiving image content and metadata of the image content, the metadata content comprising flag information indicating whether to perform image processing on the image content and image processing information; determining whether to perform the image processing for each frame based on the flag information; performing, in response to determining to perform the image processing for an image frame, the image processing based on the image processing information on the image frame; and outputting the image processed image frame on which the image processing is performed.

The image processing information may include at least one of information for enhancing sharpness of the image content, information for processing noise of the image content, information for enhancing a brightness of the image content, and information for enhancing a color of the image content.

The metadata may include information on frequency characteristics of the image content for enhancing the sharpness of the image content, and the performing the image processing may include controlling a frequency component and an intensity of an image processing filter based on the frequency characteristics of the image content included in the metadata.

The metadata may include information on a blur function of the image content for enhancing the sharpness of the image content, and the performing the image processing may include performing the image processing on the image frame using the blur function included in the metadata.

The metadata may include a noise parameter for processing the noise of the image content, and the performing the image processing may include performing the noise processing of the image frame using the noise parameter included in the metadata.

The metadata may include at least one of a brightness range information of an image for enhancing the brightness of the image content, a maximum brightness information on each scene, target brightness information, and tone mapping look-up table (LUT) curve information, and the performing the image processing may include controlling a dynamic range of the image content using at least one of the maximum brightness information on each scene, the target brightness information, and the tone mapping LUT curve information included in the metadata.

The metadata may include maximum brightness information for enhancing the brightness of the image content and black level information, and the performing the image processing may include processing the brightness of the image content by using at least one of the maximum brightness information and the black level information included in the metadata.

The metadata may include a focus map for enhancing a brightness of a specific area of the image content, and the performing the image processing may include: extracting the specific area using the focus map included in the metadata, and controlling a gain value of contrast of the specific area.

The metadata may include at least one of color gamut information for enhancing the color of the image content, color volume information on each scene, important color volume information on each scene, face color information on each scene, color mapping information, and protective color gamut designation information, and the performing the image processing may include processing the color of the image content by using at least one of the color gamut information, the color volume information on each scene, the important color volume information on each scene, the face color information on each scene, the color mapping information, and the protective color gamut designation information included in the metadata.

According to another aspect of one or more exemplary embodiments, there is provided an image processing apparatus including: a receiver configured to receive image content and metadata of the image content, the metadata comprising flag information indicating whether to perform image processing on the image content and image processing information; a transmitter configured to output image frames; and an image processor configured to determine whether to perform the image processing for each frame based on the flag information, perform, in response to determining to perform the image processing for an image frame, the image processing based on the image processing information on the image frame, and control the transmitter to output the image processed image frame.

The image processing information may include at least one of information for enhancing sharpness of the image content, information for processing noise of the image content, information for enhancing a brightness of the image content, and information for enhancing a color of the image content.

The metadata may include information on frequency characteristics of the image content for enhancing the sharpness of the image content, and the image processor may be further configured to control a frequency component and an intensity of an image processing filter based on the frequency characteristics of the image content included in the metadata to perform the image processing.

The metadata may include information on a blur function of the image content for enhancing the sharpness of the image content, and the image processor may be further configured to perform the image processing on the image frame using the blur function included in the metadata.

The metadata may include a noise parameter for processing the noise of the image content, and the image processor may be further configured to perform noise processing of the image frame using the noise parameter included in the metadata.

The metadata may include at least one of brightness range information of an image for enhancing the brightness of the image content, a maximum brightness information on each scene, target brightness information, and tone mapping look-up table (LUT) curve information, and the image processor may be further configured to control a dynamic range of the image content using at least one of the maximum brightness information on each scene, the target brightness information, and the tone mapping LUT curve information included in the metadata to perform the image processing.

The metadata may include maximum brightness information for enhancing the brightness of the image content and black level information, and the image processor may be further configured to process the brightness of the image content by using at least one of the maximum brightness information and the black level information included in the metadata to perform the image processing.

The metadata may include a focus map for enhancing a brightness of a specific area of the image content, and the image processor may be further configured to extract the specific area by using the focus map included in the metadata and control a gain value of contrast of the specific area to perform the image processing.

The metadata may include at least one of color gamut information for enhancing the color of the image content, color volume information on each scene, important color volume information on each scene, face color information on each scene, color mapping information, and protective color gamut designation information, and the image processor may be further configured to process the color of the image content by using at least one of the color gamut information, the color volume information on each scene, the important color volume information on each scene, the face color information on each scene, the color mapping information, and the protective color gamut designation information included in the metadata to perform the image processing.

According to another aspect of one or more exemplary embodiments, there is provided an image processor including: a receiver configured to receive image content and corresponding metadata, the metadata comprising flag information indicating whether to perform image processing on the image content; a transmitter configured to output image frames; and a processor configured to determine whether to perform the image processing based on the flag information, perform, in response to determining to perform the image processing, the image processing, and control the transmitter to output the image processed image frame.

The metadata may further include, when the flag information indicates to perform the image processing, image processing information, and the processor is further configured to, in response to determining to perform the image processing, perform the image processing based on the image processing information.

The image content may include a plurality of frames, the receiver may be further configured to receive metadata corresponding to each of the plurality of frames, and the processor may be further configured to determine whether to perform the image processing based on the flag information for each of the plurality of frames, and perform, in response to determining to perform the image processing on a frame of the plurality of frame, the image processing on the frame.

The image content may include a video content comprising a plurality of scenes, the receiver may be further configured to receive metadata corresponding to each of the plurality of scenes, and the processor may be further configured to determine whether to perform the image processing based on the flag information for each of the plurality of scenes, and perform, in response to determining to perform the image processing on a scene of the plurality of scenes, the image processing on the scene.

Additional and/or other aspects and advantages of one or more exemplary embodiments will be set forth in part in the description which follows and, in part, will be obvious from the description, or may be learned by practice of one or more exemplary embodiments.

BRIEF DESCRIPTION OF THE DRAWING FIGURES

The above and/or other aspects of one or more exemplary embodiments will be more apparent by describing certain exemplary embodiments with reference to the accompanying drawings, in which:

FIGS. 3A to 8D are diagrams for describing various examples of performing image processing by using metadata according to various exemplary embodiments.

DETAILED DESCRIPTION OF THE EXEMPLARY EMBODIMENTS

One or more exemplary embodiments may be variously modified and have several forms. Therefore, specific exemplary embodiments will be illustrated in the accompanying drawings and be described in detail in the present specification. However, it is to be understood that the present invention is not limited to a specific exemplary embodiment, but includes all modifications, equivalents, and substitutions without departing from the scope and spirit of the present invention. When it is determined that the detailed description of art related to one or more exemplary embodiments may obscure the disclosure of one or more exemplary embodiments, the detailed description thereof will be omitted.

Terms 'first', 'second', and the like, may be used to describe various components, but the components are not to be construed as being limited by the terms. The terms are used to distinguish one component from another component.

Terms used in the present specification are used only in order to describe specific exemplary embodiments and should not be interpreted as limiting the present invention. Singular forms are intended to include plural forms unless the context clearly indicates otherwise. It will be further understood that the terms "comprises" or "have" used in this specification, specify the presence of stated features, numerals, steps, operations, components, parts mentioned in this specification, or a combination thereof, but do not preclude the presence or addition of one or more other features, numerals, steps, operations, components, parts, or a combination thereof.

In one or more exemplary embodiments, a 'module' or a 'unit' performs at least one function or operation and may be implemented by hardware or software or a combination of the hardware and the software, such as a general or special purpose processor. Further, a plurality of 'modules' or a plurality of 'units' are integrated into at least one module except for the 'module' or 'unit' which needs to be implemented by specific hardware and thus may be implemented by at least one processor.

Hereinafter, various exemplary embodiments will be described with reference to the accompanying drawings.

Figure 1:
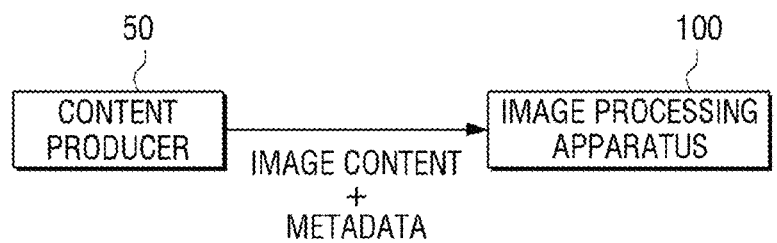
FIG. 1 is a diagram showing an image providing system according to an exemplary embodiment.

FIG. 1 is a diagram illustrating an image providing system according to an exemplary embodiment. The image providing system includes a content producer 50 and an image processing apparatus 100, i.e., an image processor.

In this case, the content producer 50 provides metadata including various information on the image content to the image processing apparatus 100, together with the image content. In this case, the content producer 50 may provide the image content and the metadata to the image processing apparatus 100 through storage media such as DVD and BD, which are only examples, and therefore the content producer 50 may provide the image content and the metadata to the image processing apparatus 100 by various methods such as through the internet and a wired network.

Meanwhile, the metadata produced by the content producer 50 may include flag information indicating whether to perform image processing for each frame and image processing information. In detail, the image processing information may include information for enhancing sharpness of the image content, information for processing noise of the image content, information for enhancing brightness of the image content, and information for enhancing a color of the image content. Further, the metadata may include the flag information which may determine whether to process the image of the image content to fit a producer's intention.

The image processing apparatus 100 uses the metadata to perform the image processing on the image content. In particular, the image processing apparatus 100 determines whether to perform the image processing for each frame based on the image processing information included in the metadata for each frame by using the flag information included in the metadata and may perform the image processing on an image frame which is determined as being subjected to the image processing, based on the image processing information included in the metadata.

Further, the image processing apparatus 100 outputs the image-processed image frame. In this case, the image processing apparatus 100 may display the image-processed image frame through a display and may transmit the image-processed image frame by a wired and wireless transmission method to an external device.

As described above, the metadata including the flag information and the image processing information are provided and thus a user may view the image-processed image content in accordance with a producer's intent.

Figure 2:
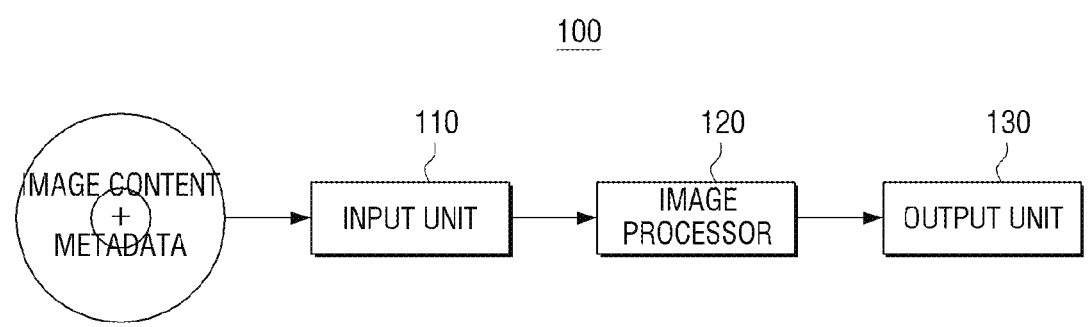
FIG. 2 is a block diagram of an image processing apparatus according to an exemplary embodiment.

FIG. 2 is a block diagram illustrating a configuration of the image processing apparatus 100 according to an exemplary embodiment. As illustrated in FIG. 2, the image processing apparatus 100 includes an input unit 110, i.e., a receiver, communicator, or transceiver, an image processor 120, i.e., a processor or a controller, and an output unit 130, i.e., a transmitter, communicator, or transceiver. In this case, the image processing apparatus 100 may be a smart television (TV), but this is only an example, and the image processing apparatus 100 may be implemented as various apparatuses, such as, as non-limiting examples, a set-top box (STB), a digital video disc (DVD) player, a Blu-ray disc (BD) player, a tablet personal computer (PC), a smart phone, and a notebook PC.

The input unit 110 receives the metadata including the image content and information on the image content. In this case, the input unit 110 may receive the image content and the metadata from a storage medium (for example, BD, DVD, etc.), but this is only an example, and the input unit 110 may receive the image content and the metadata from the outside by a wired and wireless method. Alternatively, the input unit 110 may retrieve the image content and metadata from an internal storage.

Meanwhile, the metadata input through the input unit 110 includes the flag information indicating whether to perform the image processing for each frame and the image professing information including parameters for performing the image processing on the image content. In detail, the image processing information may include at least one of the information for enhancing the sharpness of the image content, the information for processing the noise of the image content, the information for enhancing the brightness of the image content, and the information for enhancing the color of the image content.

The image processor 120 processes the image content based on the flag information and the image processing information. In detail, the image processor 120 determines whether to perform the image processing for each frame based on the flag information and may perform the image processing on the image frame determined as being subjected to the image processing based on the image processing information.

For example, the image processor 120 may acquire information on frequency characteristics of the image content to enhance the sharpness of the image content and control a frequency component and intensity of an image processing filter (for example, a band pass filter) depending on the acquired frequency characteristics of the image content to perform the image processing on the image frame. To enhance the sharpness of the image content, the band pass filter may be applied to original image content. That is, an intensity of a specific frequency band of the image content may be controlled by applying the image content to the band pass filter to control the sharpness of the image. In this case, the image processing filter may be the band pass filter, but this is only an example, and another filter may be applied instead of or in addition to the band pass filter.

Although the metadata is described as containing both the flag information and the image processing information, the metadata may contain only the flag information when the flag information indicates that the image processing is not to be performed. Further, the image processor 120 may only acquire the image processing information in a case where the flag information indicates that the image processing is to be performed.

Hereinafter, a method for enhancing sharpness of image content according to an exemplary embodiment will be described with reference to FIGS. 3A and 3B.

Figure 3A:
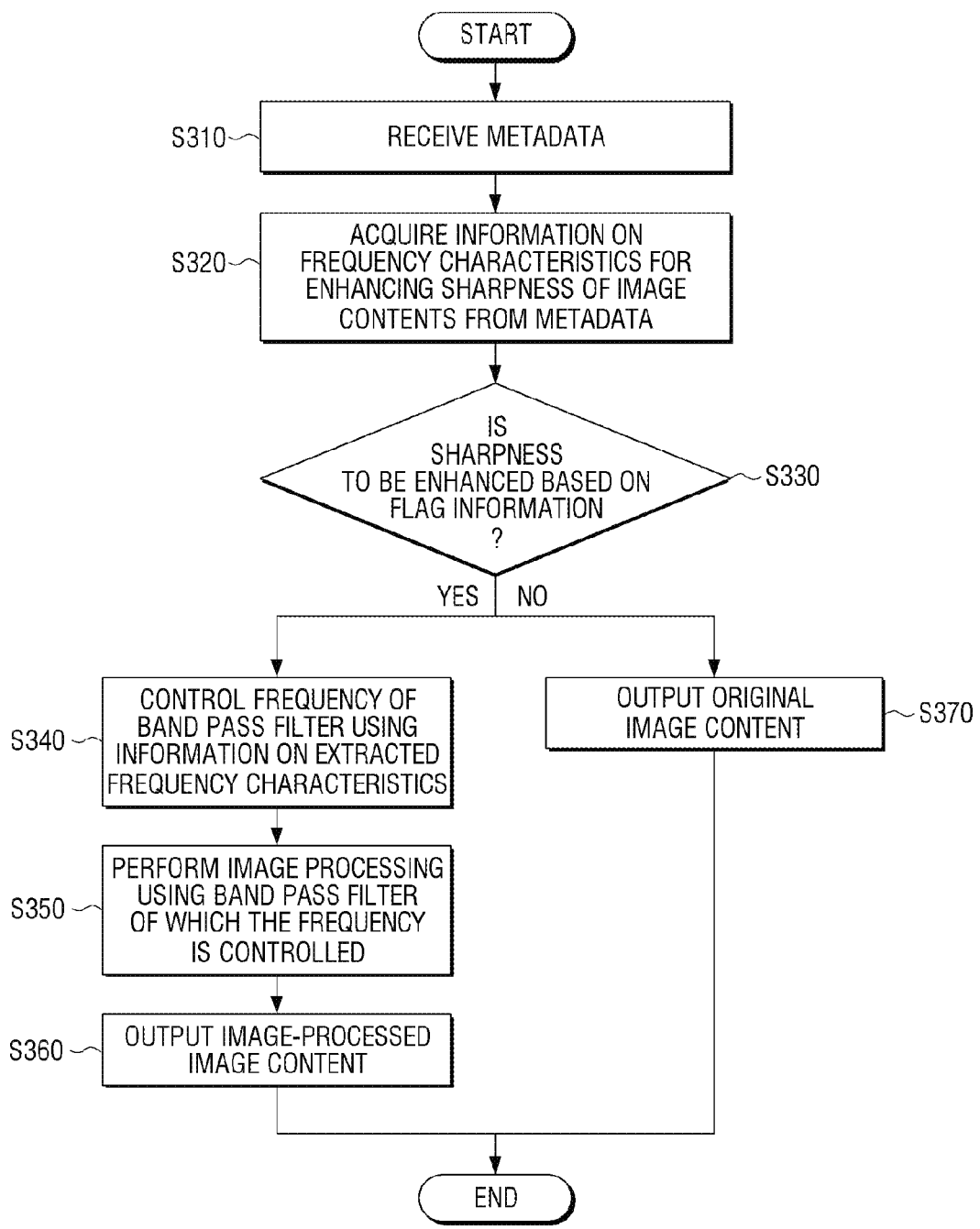

Referring to FIG. 3A, the input unit 110 receives the metadata of the image content (S310). In this case, the input metadata may include the flag information (Flag_Detail_Enhance) indicating whether to perform the image processing for enhancing the sharpness of the image content and information (DCT_X_0, . . . DCT_X_N, DCT_Y_0, . . . DCT_Y_N) on the frequency characteristics of the image content for enhancing the sharpness of the image content, as in the following Table 1.

TABLE 1

| Metadata item | Function | Example of value |
| --- | --- | --- |
| Flag_Detail_Enhance | Whether to process image for enhancing sharpness | 0: No performance of image processing for enhancing sharpness. 1: Perform image processing for enhancing sharpness |

TABLE 1-continued

| Metadata item | Function | Example of value |
| --- | --- | --- |
| DCT_X_0 | 0-th value of DCT component in X direction | R_X_0 |
| . . . | . . . | . . . |
| DCT_X_N | N-th value of DCT component in X direction | R_X_N |
| DCT_Y_0 | 0-th value of DCT component in Y direction | R_Y_0 |
| . . . | . . . | . . . |
| DCT_Y_N | N-th value of DCT component in Y direction | R_Y_N |

In this case, the DCT_X_0 to DCT_X_N among the frequency characteristics of the image content is a discrete cosine transform (DCT) coefficient in an X direction and the DCT_Y_0 to DCT_Y_N is a DCT coefficient in a Y direction. In this case, as a value of the DCT coefficient approaches 0, a frequency is decreased, and as the DCT coefficient increases, the frequency increases.

The image processor 120 acquires the information on the frequency characteristics for enhancing the sharpness of the image content from the input metadata (S320). That is, the image processor 120 acquires a DCT coefficient in an X direction and a DCT coefficient in a Y direction of the input image.

Further, the image processor 120 uses the flag information to determine whether to enhance the sharpness (S330). In detail, the image processor 120 may not perform the image processing for enhancing the sharpness of the image content when the flag value is 0 and may perform the image processing for enhancing the sharpness of the image content when the flag value is 1.

If the enhancement of the sharpness of the image content is required, the image processor 120 controls a frequency of the band pass filter by using the information on the extracted frequency characteristics (S340). In detail, the image processor 120 may apply a high frequency band pass filter in the case of the image content with a high frequency signal and may apply a low frequency band pass filter in the case of the image content with a low frequency signal. If the band pass filter is applied without considering the frequency of the image content, unique signals included in the image content may not be properly represented. For example, if the low frequency band pass filter is applied to an image with the high frequency signal, detail signals are thickened and agglomerated, and, thus, a low-quality image is output. Therefore, the image processor 120 may control the frequency band of the band pass filter for enhancing the sharpness of the image content by using the information on the extracted frequency characteristics.

Further, the image processor 120 performs the image processing by using the band pass filter of which the frequency is controlled (S350). Further, the output unit 130 outputs the image-processed image content (S360).

However, if it is determined that the sharpness of the image content is not to be enhanced based on the flag information, the image processor 120 outputs original image content are (S370). Alternatively, the image processor 120 may perform the image processing for enhancing the sharpness of the image content using a default band pass filter which is set in the image processing apparatus 100. The default band pass filter may be preset or set by a user.

Figure 3B:
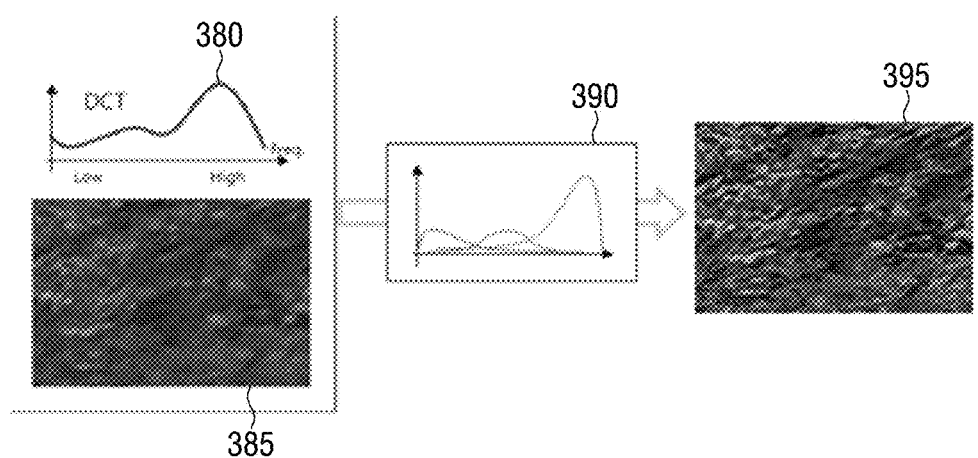

That is, as illustrated in FIG. 3B, the image processing apparatus 100 may receive image content 385 and frequency information 380 on the image content and may control a frequency component and an intensity of a band pass filter 390 based on the frequency information 380 of the input image content to output image content 395 with enhanced sharpness.

According to another exemplary embodiment, the image processor 120 may acquire information on a blur function of the image content for enhancing the sharpness of the image content from the metadata and perform the image processing on the image frame by using an inverse function of the blur function. In detail, most image content have a problem of reduction of the sharpness of the image content due to external elements (lens blur, motion blur, etc.) while the image is acquired. To remove the blur phenomenon which is an element causing the reduction in sharpness, the image processing apparatus may estimate the blur function and apply an inverse function of the estimated blur function to the image content to acquire the image content with the enhanced sharpness. In detail, if Y is called current input image content, X is called clear image content before being blurred, and the blur function is H, this may be represented by the following Equation 1.

$$Y=HX \quad \text{[Equation 1]}$$

Here, when there is no information on the blur function which leads to the blur phenomenon, it is difficult to obtain the X but if the inverse function of the blur function which leads to the blur phenomenon may be appreciated based on the metadata, the clear image content before being blurred as represented by the following Equation 2 may be acquired.

$$X=H^{-1}Y \quad \text{[Equation 2]}$$

Therefore, when the inverse function of the blur function is included in the metadata, the image processing apparatus 100 may remove the blur phenomenon of the image content to enhance the sharpness of the image content.

Figure 4A:
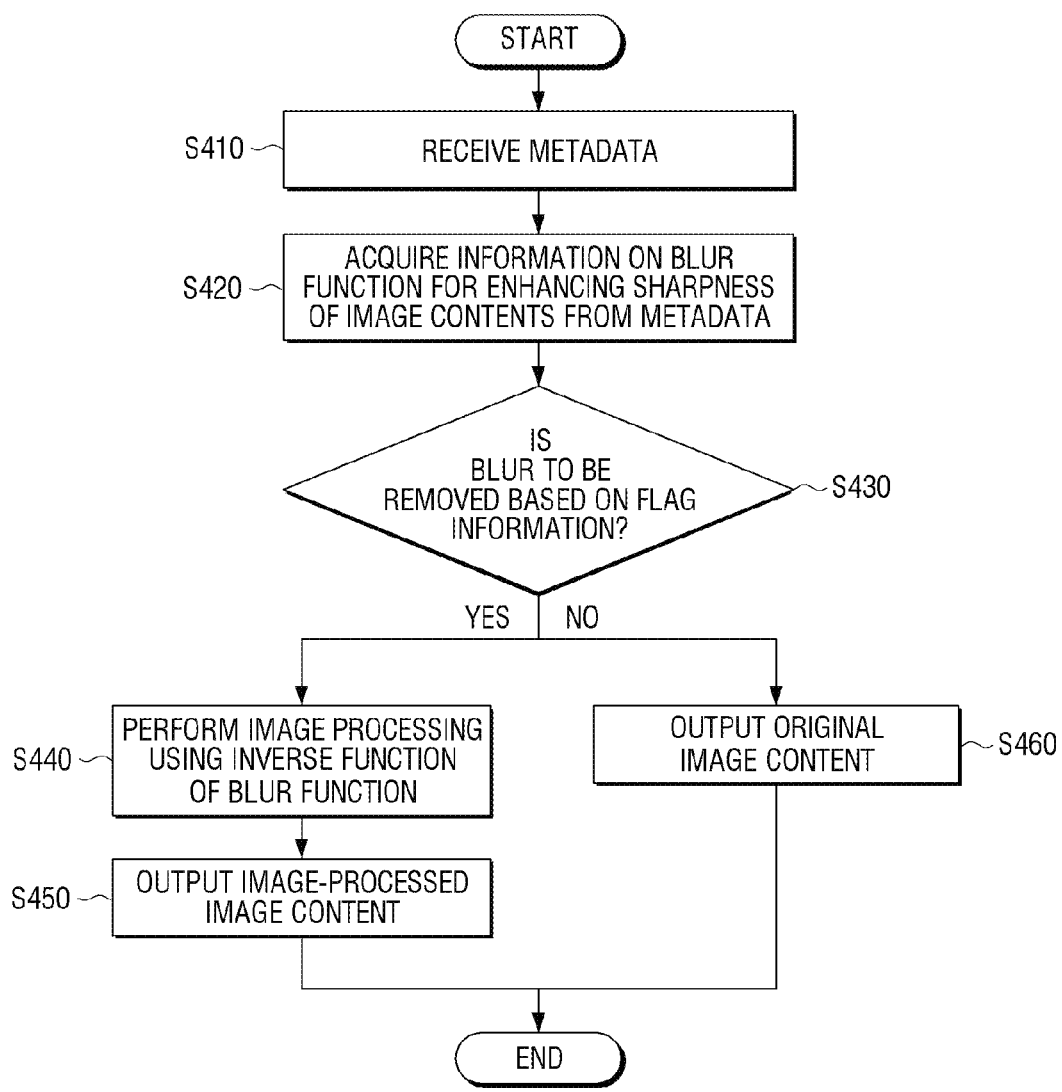

Hereinafter, a method for enhancing sharpness of image content according to another exemplary embodiment will be described with reference to FIGS. 4A and 4B.

First, the input unit 110 receives the metadata of the image content (S410). In this case, the input metadata may include flag information (Flag_Blur_Remove) indicating whether to remove the blur from the current frame and information (Blur_Model, Param_Motion_Blur, Param_Gaussian_Blur) on the blur of the current frame as in the following Table 2.

TABLE 2

| Metadata item | Function | Example of value |
|---|---|---|
| Flag_Blur_Remove | Whether to remove blur from current frame | 0: No removal of blur<br>1: Remove blur |
| Blur_Model | Kind of blur model of current frame | 0: No<br>1: Motion blur<br>2: Gaussian blur |
| Param_Motion_Blur | Size and direction of motion blur | Vector in x and y directions |
| Param_Gaussian_Blur | Parameter of Gaussian blur | STD |

Further, the image processor 120 acquires the information on the blur function for enhancing the sharpness of the image content from the input metadata (S420). For example, the image processor 120 may acquire a kind of blur model of a current frame and parameters of the blur model.

Further, the image processor 120 uses the flag information to determine whether to remove the blur (S430). In detail, the image processor 120 may not perform the blur removal for when the flag value is 0 and may perform the blur removal when the flag value is 1.

If it is determined that the blur removal is required, the image processor 120 uses the inverse function of the blur function to perform the image processing (S440). In detail, the image processor 120 may use the parameters of the blur model to generate the blur function and calculate the inverse function of the generated blur function. Further, the image processor 120 may use the calculated inverse function of the blur function to perform the image processing for removing the blur. Further, the output unit 130 outputs the image-processed image content (S450).

However, if it is determined that the blur removal is not required, the image processor 120 outputs the original image content (S460). In detail, the image processor 120 determines that the blur is generated by a producer's intention and may output an original image without removing the generated blur.

Figure 4B:
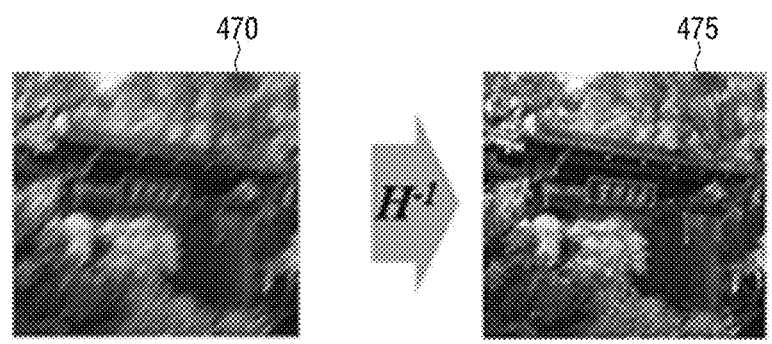

That is, as illustrated in FIG. 4B, the image processing apparatus 100 may apply the inverse function of the blur function $H^{-1}$ to an image frame 470 in which the blur phenomenon occurs to output the image frame 475 from which the blur phenomenon is removed.

According to another exemplary embodiment, the image processor 120 may acquire noise parameters for processing the noise of the image content from the metadata and perform the noise processing of the image frame by using the acquired noise parameters. In detail, unlike general noise, the film grain noise may be inserted by the producer's intention. Therefore, when the general image processing apparatus 100 removes film grain noise, the noise is removed contrary to the producer's intention of the image content. Therefore, the image processor 120 may determine whether to remove the noise from the flag information and properly remove the noise of the image frame based on the noise parameter.

Hereinafter, the method for processing noise of image content according to the exemplary embodiment will be described with reference to FIG. 5.

First, the input unit 110 receives the metadata of the image content (S510). In this case, the input metadata may include flag information (Flag_Grain_Noise) indicating whether to process the noise of the current frame and a noise parameter (Param_Grain_Noise) as in the following Table 3.

TABLE 3

| Metadata item | Function | Example of value |
|---|---|---|
| Flag_Grain_Noise | Whether to process film grain noise of current frame | 0: No film grain noise processing<br>1: Process of film grain noise |
| Param_Grain_Noise | Information on film grain noise parameter | NR setting value, DE setting value, etc. of grain noise |

Further, the image processor 120 acquires the noise parameter for the noise processing of the image content from the metadata (S520). In this case, the noise parameter for the noise processing of the image content may include a noise reduction (NR) setting value of noise, detail enhancement (DE) setting value, and the like.

Further, the image processor 120 uses the flag information to determine whether to process the noise (S530). In detail, when the flag value is 0, the image processor 120 may not perform the film grain noise processing of the image frame and, when the flag value is 1, may perform the film grain noise processing of the image frame.

When there is a need to perform the film grain noise processing on the current image frame, the image processor 120 processes the noise with the NR setting value and the DE setting value which are included in the metadata (S540). The image processor 120 may prevent the film grain noise included in the current frame from being removed based on the NR setting value included in the metadata and may prevent the phenomenon that the noise excessively stands out by using the DE setting value included in the metadata. Further, the output unit 130 outputs the noise-processed image content (S550).

However, when there is a need to perform the basic noise processing and not the film grain noise processing on the current image frame, the image processor 120 performs the noise processing based on the basic NR setting value and the basic DE setting value which are set (S560). Further, the output unit 130 outputs the image content on which the basic noise processing is performed (S550).

As described above, image processor 120 may process the noise to fit the producer's intention and may output the image content fitting the producer's intention.

According to another exemplary embodiment, the image processor 120 may acquire at least one of maximum brightness information and black level information for enhancing the brightness of the image content from metadata and perform the image processing on the brightness of the image content by using at least one of the acquired maximum brightness information and black level information. In detail, when both of a bright area and a dark area are simultaneously present within the input image content, if the brightness of the image is controlled to make the dark portion look better, the phenomenon that the bright portion is excessively bright may occur. Further, in the case of making the bright area dark for better visibility of the bright area, the phenomenon that the dark portion is excessively dark may occur. Therefore, in the case of setting maximum brightness and minimum brightness of the image content depending on at least one of the maximum brightness information and the black level information of the image content, the problem that the image is excessively dark or excessively bright may be solved.

Figure 6B:
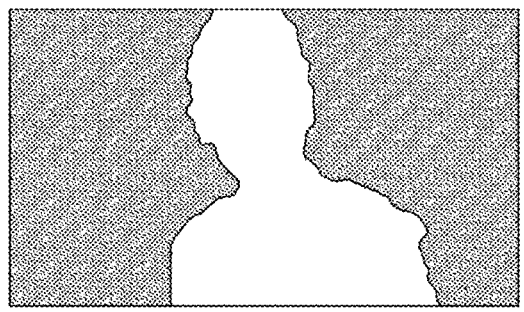

Further, as illustrated in FIG. 6B, the image processor 120 may acquire a focus map for enhancing the brightness of a specific area of the image content from the metadata, extract the specific area by using the acquired focus map, and control a gain value of contrast of the specific area to perform the image processing on the image content. In detail, to enhance the contrast for the specific area (for example, characters, and the like) within the image content, the image processor 120 may extract the specific area and perform the image processing on the image content by improving the contrast for the extracted area.

Hereinafter, a method for enhancing brightness of image content according to an exemplary embodiment will be described with reference to FIGS. 6A and 6B.

First, the input unit 110 receives the metadata of the image content (S610). In this case, the input metadata may include flag information (Flag_Contrast_Limit) indicating whether there is a need to activate a limit of brightness and gray scale expression in the current frame, a parameter (Param_Contrast_Peak) for limiting the brightness and gray scale expression, flag information (Flag_Focus_Object) indicating whether a focus highlight function is required, and a parameter (Map_Object_Contrast, Param_Object_Contrast) for focus highlight.

TABLE 4

| Metadata item | Function | Example of value |
|---|---|---|
| Flag_Contrast_Limit | Whether there is a need to activate brightness and gray scale expression | 0: No required. 1: Required |
| Param_Contrast_Peak | Parameter for limiting brightness and gray scale expression | Max_Peak_Level Max_Black_Level |
| Flag_Focus_Object | Whether focus highlight function is required | 0: No required 1: Required |
| Map_Object_Contrast | Focus map | Binary map |
| Param_Object_Contrast | Contrast of highlighted object | CE gain value for object area within focus map |

Further, the image processor 120 extracts the parameter for enhancing the brightness of the image content from the input metadata (S620). In this case, as shown in the above Table 4, as the parameter for enhancing the brightness of the image content, a parameter (Max_Peak_Level, Max_Black_Level) for limiting the brightness and gray scale expression and the parameter (focus map, CE gain value, etc.) for enhancing the contrast of the specific area, and the like for the focus highlight function for enhancing contrast may be included.

Further, the image processor 120 confirms whether there is a need to limit the brightness and gray scale expression from the flag information (S630). In detail, when the flag information indicating whether there is a need to activate the limit of the brightness and gray scale expression is 0, the image processor 120 does not perform the limit of the brightness and gray scale expression and, when the flag information indicating whether there is a need to activate the brightness and gray scale expression limit is 1, the image processor 120 may limit the brightness and gray scale expression to perform the image processing.

When there is a need to activate the brightness and gray scale expression limit, the image processor 120 uses at least one of the maximum brightness information and the black level information to perform the image processing (S640). In detail, the image processor 120 may use at least one of the maximum brightness information and the black level information to set the maximum brightness and the minimum brightness of the image content and perform the image processing within the set maximum brightness and minimum brightness range. Further, the output unit 130 outputs the image-processed image content (S650).

However, when the limit of the brightness and gray scale representation is not required, the image processor 120 confirms whether the focus highlight function is required (S660). In this case, the focus highlight function is a function of enhancing the contrast for the specific area within the image content. In detail, when the flag information indicating whether the focus highlight function is required is 0, the image processor 120 does not perform the focus highlight function and when the flag information indicating whether the focus highlight function is required is 1, the image processor 120 may perform the focus highlight function.

If it is determined that the focus highlight function is required, the image processor 120 uses the focus map to perform the image processing for enhancing the contrast for the specific area (S670). In detail, as illustrated in FIG. 6B, the image processor 120 uses the focus map for the specific object to mask the rest of the image excluding the specific object and may apply the CE gain value included in the metadata to the specific portion to perform the image processing. Further, the output unit 130 outputs the image-processed image content (S650).

If it is determined that the focus highlight function is not required, the image processor 120 performs the image processing for the image content by using the basic setting value (S680) and the output unit 130 outputs the image-processed image content (S650).

According to another exemplary embodiment, the image processor 120 acquires at least one of brightness range information of an image for enhancing the brightness of the image content, maximum brightness information on each scene, target brightness information, and tone mapping look-up table (LUT) curve information from the metadata and may use at least one of the acquired maximum brightness information on each scene, the target brightness information, and the tone mapping LUT curve information to control the dynamic range of the image content so as to perform the image processing on the image frame.

In particular, to display image content produced as a high dynamic range (HDR) on a general display panel, the tone mapping process is required. Therefore, the image processor 120 may prevent a portion beyond the maximum brightness having the general display panel from being saturated, acquire the dynamic range control parameter (for example, brightness range information on an image, maximum brightness information for each scene, and the like) for the tone mapping to which the producer's intention is reflected, and perform the tone mapping by using the acquired parameter.

Further, to display the image content produced as a low dynamic range (LDR) on a general display device, the tone mapping process is performed and the LDR image content generated by the tone mapping process may be converted into the HDR image content. Therefore, the image processor 120 may acquire dynamic range control parameters (for example, brightness range information, maximum brightness information for each scene, target brightness information, and tone mapping LUT curve information, and the like) for tone mapping and perform the tone mapping by using the acquired parameter.

Hereinafter, an image processing method for enhancing brightness of image content according to another exemplary embodiment will be described with reference to FIGS. 7A to 7D. First, FIGS. 7A and 7B describe the image processing method for enhancing brightness of image content when the HDR image content are input.

Referring to image 7A, the input unit 110 receives HDR content (S710). In this case, the input unit 110 may also receive the metadata which includes the dynamic range control parameters (for example, brightness range information of an image, maximum brightness information for each scene, and the like) for tone mapping of the HDR content.

Further, the image processor 120 uses the dynamic range control parameters to process the image (S720). In detail, the image processor 120 may use the dynamic range control parameters to reduce the dynamic range deviating from the brightness range of the current target display device to the brightness range of the target display device and control the brightness of the input image content within the reduced dynamic range.

Further, the output unit 130 outputs the image-processed image content (S730).

Figure 7A:
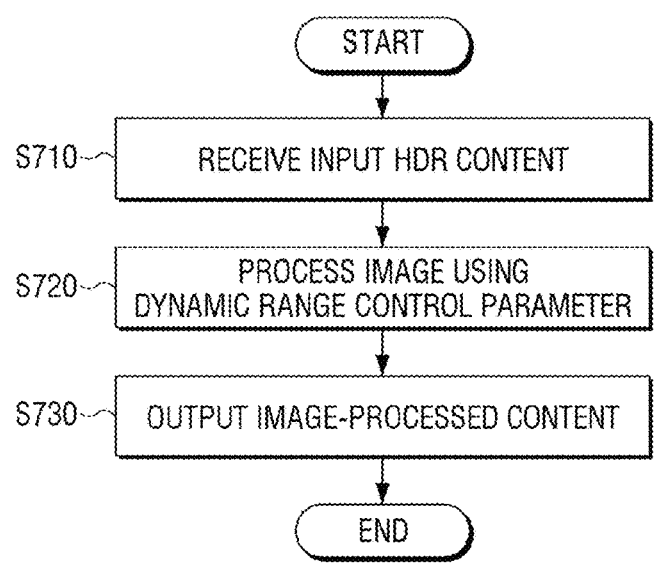
Figure 7B:
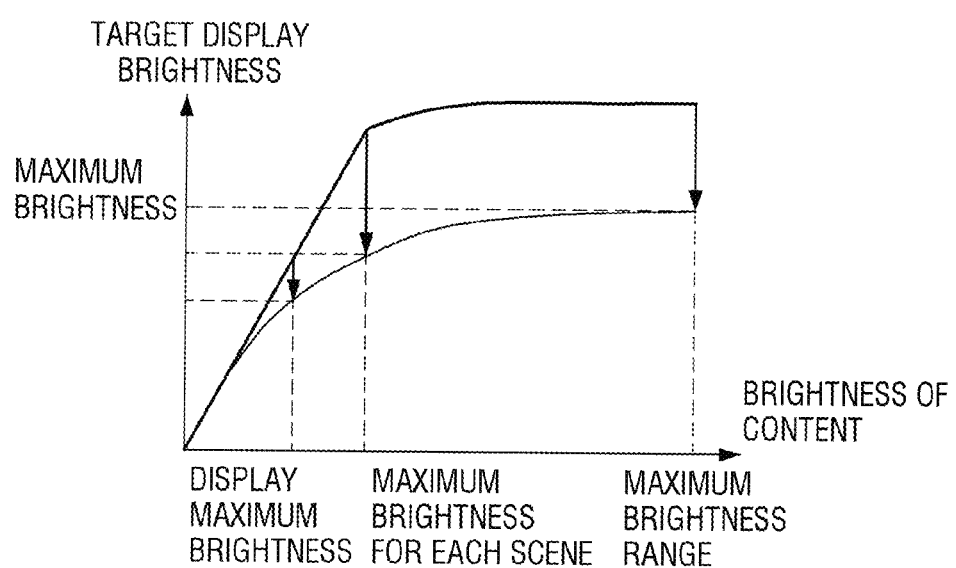
Figure 7C:
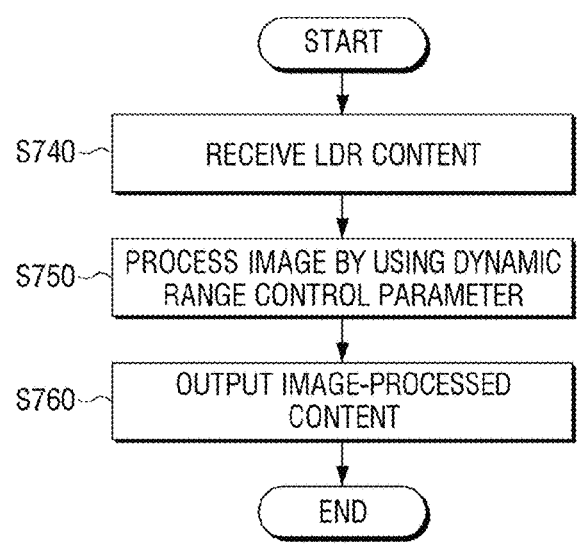
Figure 7D:
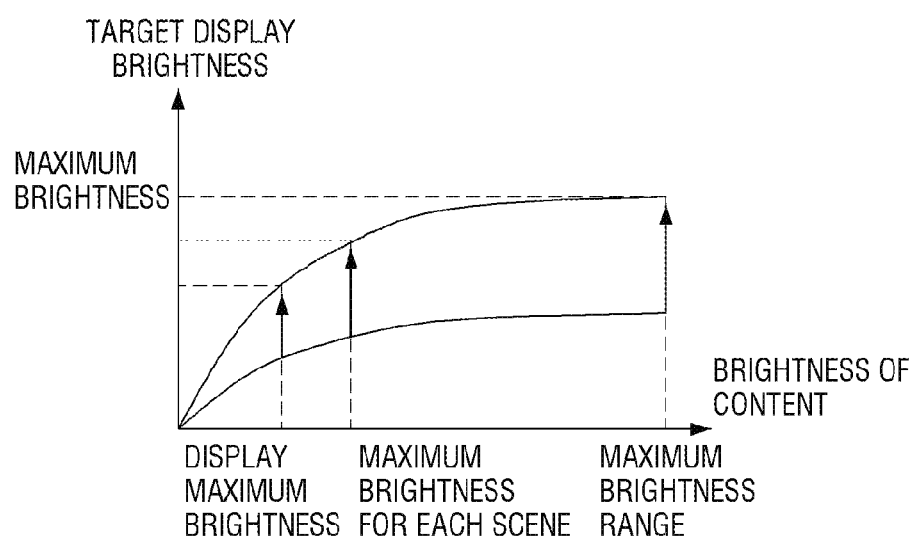

Further, FIGS. 7C and 7D describe the image processing method for enhancing brightness of image content when the LDR image content are input.

Referring to image 7C, the input unit 110 receives the LDR content (S740). In this case, the input unit 110 may also receive the metadata which includes the dynamic range control parameters (for example, brightness range information of an image, maximum brightness information for each scene, target brightness information, tone mapping LUT curve information, and the like) for the tone mapping of the LDR content.

Further, the image processor 120 uses the dynamic range control parameters to process the image (S750). In detail, the image processor 120 may use the dynamic range control parameters to expand the dynamic range present within the brightness range of the current target display device to the maximum brightness range which may be represented by the current target display device and control the brightness of the input image content within the expanded dynamic range as illustrated in FIG. 7D.

Further, the output unit 130 outputs the image-processed image content (S760).

As described above, according to one or more exemplary embodiments, the user may view the image content having the enhanced contrast within the maximum output range of the current display device.

According to another exemplary embodiment, the image processor 120 acquires at least one of color gamut information for enhancing a color of the image content, color volume information on each scene, important color volume information on each scene, face color information on each scene, color mapping information, and protective color gamut designation information, and may use at least one of the acquired color gamut information, color volume information on each scene, important color volume information on each scene, face color information on each scene, color mapping information, and protective color gamut designation information to perform the image processing on the color of the image content.

In detail, the image processor 120 preferentially confirms the color gamut information on the original image content. Further, the image processor 120 performs a comparison of the color gamut of the original image content with the color gamut which may be represented by the current display device. When the color gamuts are the same, the color gamut mapping is not required and therefore the image processor 120 may process a color depending on a screen mode selected by a viewer. When the color gamuts are different from each other, the image processor 120 may perform the color gamut mapping operation and process the color depending on the screen mode selected by the viewer.

Hereinafter, the image processing method for enhancing a color of image content will be described with reference to FIGS. 8A to 8D.

Figure 8B:
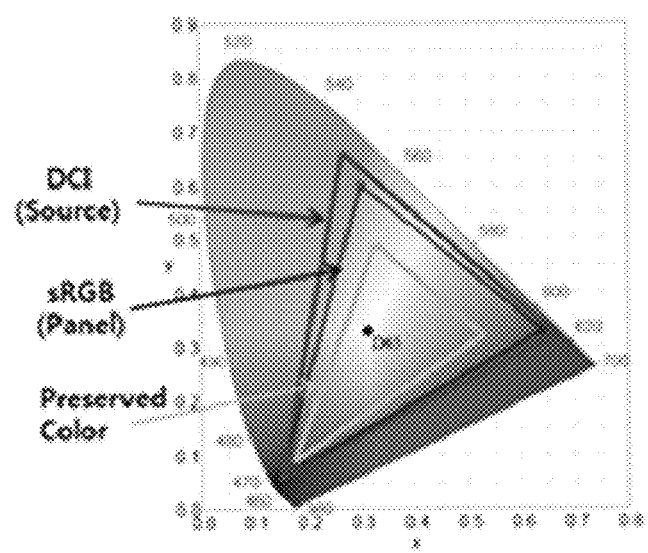
Figure 8C:
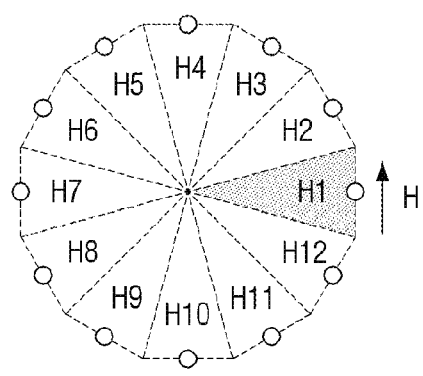

Referring to FIG. 8A, the input unit 110 receives the metadata (S810). As shown in the following Table 5, the metadata may include the color gamut information on the original image content, the color volume information in a scene unit, the important color volume information in a scene unit, the face color information in a scene unit, the information on the color mapping method, and the protective color gamut designation information, and the like. FIG. 8C is a diagram for describing the color volume in the scene unit and the important color volume in the scene unit. The general image content may be represented by a RGB value or the color volume configuration of the image content may be three-dimensionally represented by using the HSV color domain similar to a human color cognition characteristic, as shown in FIG. 8C. When the corresponding color is present in the scene, color volume configuration is designated as 1 and, when the corresponding color is not present in the scene, color volume configuration is designated as 0, the color configuration information may be represented for each scene. Although the HSV color domain is used in FIG. 8C, this is merely an example, and a Lab color domain, an XYZ color domain, and the like may be used. The color volume information and the important color volume information in the scene unit may be used to enhance visual sensitivity color. The enhancement of the general visual sensitivity color keeps a hue component of color and is used in a direction in which the saturation is increased and therefore the increasing value of the saturation component may be applied as an optimum value by using the HSV color domain. Further, FIG. 8D is a diagram for describing the face color information in the scene unit. The face color information in the scene unit may be automatically detected as a face area, but may be designated by the user and may be used to improve the visual sensitivity color like the above-mentioned color volume information and important color volume information in the scene unit.

the original image content to the color gamut of the display panel (S870). In detail, FIG. 8B is a conceptual diagram of the color gamut indicating the color gamut mapping and the protective color gamut according to an exemplary embodiment. When the color gamut of the original content is DCI-P3 and the color gamut of the display is sRGB, the image processor 120 may linearly or non-linearly compress the color of the original content or maintain the color gamut in the display and clip only the external color gamut. Further, by a combination of the two methods, an original color may be maintained in the protective color gamut inside the display color and a compression method may be selected outside the protective color gamut. Further, the content producer may hold both of customer content for showing a movie for the same image and general content for showing TV and the like, and therefore calculates the correlation between the colors of the two content to produce the

TABLE 5

| Metadata item | Function | Example of value |
| --- | --- | --- |
| Color Space of original image content | Information on color gamut of original color content | 0: 709<br>1: DCI-P3 |
| Color volume information in scene unit | Enhance visual sensitivity color using color distribution | HSV color volume (12 × 8 × 8 voxels) |
| Important color volume information in scene unit | Prevent distortion at the time of enhancing visual sensitivity color by allowing producer to designate important color. | HSV color volume (12 × 8 × 8 voxels) |
| Face color information in scene unit | Prevent skin color from being distorted by enhancing visual sensitivity color | Face color range |
| Color mapping method | Mapping method when color gamut of display is smaller than that of original image | 0: Clipping<br>1: Shrink |
| Protective color gamut designation | Designate protective color gamut in color gamut of display panel | 0: Preserving<br>1: Compression |

Further, the image processor 120 acquires the parameter for enhancing the color of the image content from the input metadata (S820). In detail, as shown in the above Table 5, the image processor 120 may acquire the color gamut information on the original image content, the color volume information in the scene unit, the important color volume information in the scene unit, the face color information in the scene unit, the information on the color mapping method, and the protective color gamut designation information, and the like.

Further, the image processor 120 determines whether the mapping of the color gamuts of the display panel is required by confirming the color gamut information of the original image content (S830), i.e., comparing the color gamut information of the original image content with the color gamut of the display panel. In this case, the image processor 120 may determine that the mapping is not required when the color gamut of the original image content is the same as the color gamut of the display panel and determine that the mapping is required when the color gamut of the original image content is different from the color gamut of the display panel.

If it is determined that the mapping of the color gamut is not required, the image processor 120 determines what the screen mode selected by the user is (S840). When the screen mode selected by the user is a movie mode, the image processor 120 performs precise color representation processing (S850) and, when the user selects a clear mode, the image processor 120 uses the color volume information in the scene unit to perform the image processing for enhancing a visual color (S860).

If it is determined that the mapping of the color gamuts is required, the image processor 120 maps the color gamut of mapping function. The mapping method may be included in the metadata by the producer.

Further, the image processor 120 determines what the screen mode selected by the user is (S880). When the screen mode selected by the user is a movie mode, the image processor 120 performs precise color representation processing (S890) and when the user selects a clear mode, the image processor 120 uses the color volume information in the scene unit to perform the image processing for enhancing a visual color (S895).

As described above, the image content are processed using the metadata for enhancing the color of the image content and thus the user may view the image content fitting the producer's intention.

Referring back to FIG. 2, the output unit 130 outputs the image content processed by the image processor 120. In this case, the output unit 130 may be implemented as a display to output the processed image content or be implemented as an output terminal to transmit the processed image content to an external device (for example, a display device).

Figure 9:
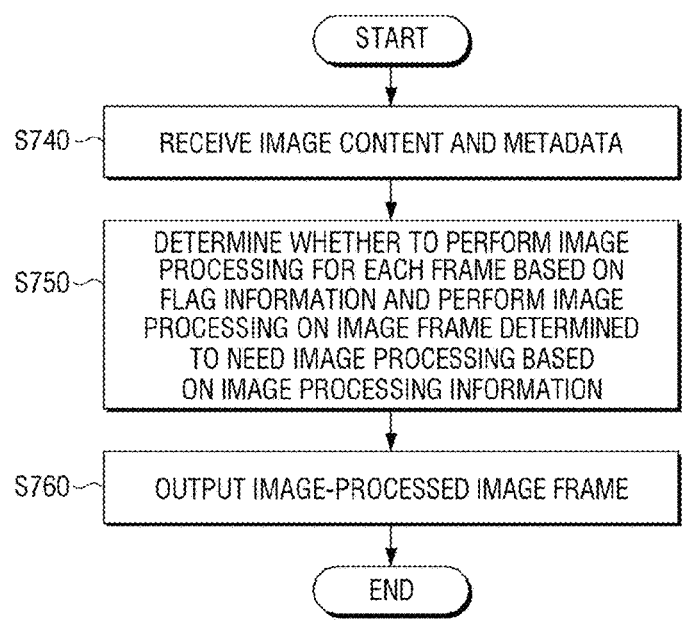
FIG. 9 is a flow chart describing an image processing method of an image processing apparatus according to an exemplary embodiment.

Hereinafter, the image processing method of the image processing apparatus 100 according to one or more exemplary embodiments will be described with reference to FIG. 9.

The image processing apparatus 100 receives the image content and the metadata (S910). In this case, the metadata may include the flag information indicating whether to perform the image processing and the image processing information.

Further, the image processing apparatus 100 determines whether to perform the image processing for each frame based on the flag information and perform the image processing on the image frame determined as being subjected to the image processing based on the image processing information (S920).

Further, the image processing apparatus 100 outputs the image-processed image frame (S930).

As described above, the image processing apparatus 100 may perform the image processing according to the intention of the producer of the image content and provide the processed image content to the user, by using the metadata, which reflects the intention of the producer of the image content, for image processing.

Meanwhile, the image processing method of the image processing apparatus according to the above-mentioned various exemplary embodiments may be implemented as a program and thus may be provided to the display device or the input device. In particular, the program including the method for controlling a display device may be provided while being stored in a non-transitory computer readable medium.

The non-transitory computer readable medium is not a medium that stores data therein for a short time, such as a register, a cache, a memory, or the like, but means a medium that semi-permanently stores data therein and is readable by a device. For example, various applications or programs described above may be stored and provided in a non-transitory computer readable medium such as a compact disk (CD), a digital versatile disk (DVD), a hard disk, a Blu-ray disk, a universal serial bus (USB) drive, a memory card, a read only memory (ROM), or the like.

As described above, according to one or more exemplary embodiments, the image processing apparatus may perform the image processing to fit the producing intention of the producer of the image content and provide the processed image content to the user, based on the metadata. The intention of the producer of the image content may reflected by using the metadata.

Although various exemplary embodiments have been shown and described hereinabove, the present invention is not limited to the specific exemplary embodiments described above, but may be variously modified by those skilled in the art to which the present invention pertains without departing from the scope and spirit of the invention as disclosed in the accompanying claims and their equivalents. In addition, such modifications should also be understood to fall within the scope and spirit of the present invention.

What is claimed is:

1. An image processing method, comprising:
   receiving image content and metadata of the image content, the metadata comprising flag information indicating whether to perform image processing on the image content and image processing information;
   performing the image processing based on the flag information and the image processing information on an image frame; and
   outputting the image processed image frame on which the image processing is performed,
   wherein the image processing information comprises at least one of information for enhancing sharpness of the image content, information for processing noise of the image content, information for enhancing a brightness of the image content, and information for enhancing a color of the image content,
   wherein the metadata comprises information on frequency characteristics of the image content for enhancing the sharpness of the image content, and
   wherein the performing the image processing comprises controlling a frequency component and an intensity of an image processing filter based on the frequency characteristics of the image content included in the metadata.

2. The image processing method as claimed in claim 1, wherein
   the metadata comprises information on a blur function of the image content for enhancing the sharpness of the image content, and
   the performing the image processing comprises performing the image processing on the image frame using the blur function included in the metadata.

3. The image processing method as claimed in claim 1, wherein
   the metadata comprises a noise parameter for processing the noise of the image content, and
   the performing the image processing comprises performing the noise processing of the image frame using the noise parameter included in the metadata.

4. The image processing method as claimed in claim 1, wherein
   the metadata comprises at least one of brightness range information of an image for enhancing the brightness of the image content, maximum brightness information on each scene, target brightness information, and tone mapping look-up table (LUT) curve information, and
   the performing the image processing comprises controlling a dynamic range of the image content using at least one of the maximum brightness information on each scene, the target brightness information, and the tone mapping LUT curve information included in the metadata.

5. The image processing method as claimed in claim 1, wherein
   the metadata comprises a focus map for enhancing a brightness of a specific area of the image content, and
   the performing the image processing comprises:
      extracting the specific area using the focus map included in the metadata, and
      controlling a gain value of contrast of the specific area.

6. The image processing method as claimed in claim 1, wherein
   the metadata comprises at least one of color gamut information for enhancing the color of the image content, color volume information on each scene, important color volume information on each scene, face color information on each scene, color mapping information, and protective color gamut designation information, and
   the performing the image processing comprises processing the color of the image content by using at least one of the color gamut information, the color volume information on each scene, the important color volume information on each scene, the face color information on each scene, the color mapping information, and the protective color gamut designation information included in the metadata.

7. The image processing method as claimed in claim 1, wherein
   the metadata comprises maximum brightness information for enhancing the brightness of the image content and black level information, and
   the performing the image processing comprises processing the brightness of the image content by using at least one of the maximum brightness information and the black level information included in the metadata.

8. An image processing apparatus, comprising:
a receiver configured to receive image content and metadata of the image content, the metadata comprising flag information indicating whether to perform image processing on the image content and image processing information;
a transmitter configured to output image frames; and
an image processor configured to perform the image processing based on the flag information and the image processing information on an image frame, and control the transmitter to output the image processed image frame,
wherein the image processing information comprises at least one of information for enhancing sharpness of the image content, information for processing noise of the image content, information for enhancing a brightness of the image content, and information for enhancing a color of the image content,
wherein the metadata comprises information on frequency characteristics of the image content for enhancing the sharpness of the image content, and
wherein the image processor is further configured to control a frequency component and an intensity of an image processing filter based on the frequency characteristics of the image content included in the metadata to perform the image processing.

9. The image processing apparatus as claimed in claim 8, wherein
the metadata comprises information on a blur function of the image content for enhancing the sharpness of the image content, and
the image processor is further configured to perform the image processing on the image frame using the blur function included in the metadata.

10. The image processing apparatus as claimed in claim 8, wherein the metadata comprises a noise parameter for processing the noise of the image content, and
the image processor is further configured to perform noise processing of the image frame using the noise parameter included in the metadata.

11. The image processing apparatus as claimed in claim 8, wherein
the metadata comprises at least one of brightness range information of an image for enhancing the brightness of the image content, maximum brightness information on each scene, target brightness information, and tone mapping look-up table (LUT) curve information, and
the image processor is further configured to control a dynamic range of the image content using at least one of the maximum brightness information on each scene, the target brightness information, and the tone mapping LUT curve information included in the metadata to perform the image processing.

12. The image processing apparatus as claimed in claim 8, wherein
the metadata comprises a focus map for enhancing a brightness of a specific area of the image content, and
the image processor is further configured to extract the specific area by using the focus map included in the metadata and control a gain value of contrast of the specific area to perform the image processing.

13. The image processing apparatus as claimed in claim 8, wherein
the metadata comprises at least one of color gamut information for enhancing the color of the image content, color volume information on each scene, important color volume information on each scene, face color information on each scene, color mapping information, and protective color gamut designation information, and
the image processor is further configured to process the color of the image content by using at least one of the color gamut information, the color volume information on each scene, the important color volume information on each scene, the face color information on each scene, the color mapping information, and the protective color gamut designation information included in the metadata to perform the image processing.

14. The image processing apparatus as claimed in claim 8, wherein
the metadata comprises maximum brightness information for enhancing the brightness of the image content and black level information, and
the image processor is further configured to process the brightness of the image content by using at least one of the maximum brightness information and the black level information included in the metadata to perform the image processing.

15. An image processor, comprising:
a receiver configured to receive image content and corresponding metadata, the metadata comprising flag information indicating whether to perform image processing on the image content;
a transmitter configured to output image frames; and
a processor configured to perform the image processing, and control the transmitter to output the image processed image frame,
wherein the metadata further comprises, when the flag information indicates to perform the image processing, image processing information,
wherein the processor is further configured to perform the image processing based on the flag information and the image processing information,
wherein the image processing information comprises at least one of information for enhancing sharpness of the image content, information for processing noise of the image content, information for enhancing a brightness of the image content, and information for enhancing a color of the image content,
wherein the metadata further comprises information on frequency characteristics of the image content for enhancing the sharpness of the image content, and
wherein the processor is further configured to control a frequency component and an intensity of an image processing filter based on the frequency characteristics of the image content included in the metadata to perform the image processing.

* * * * *